N. S. VALENTINE.
BEVERAGE MIXING AND DISPENSING MACHINE.
APPLICATION FILED DEC. 9, 1912.
1,180,344.
Patented Apr. 25, 1916.
2 SHEETS—SHEET 1.
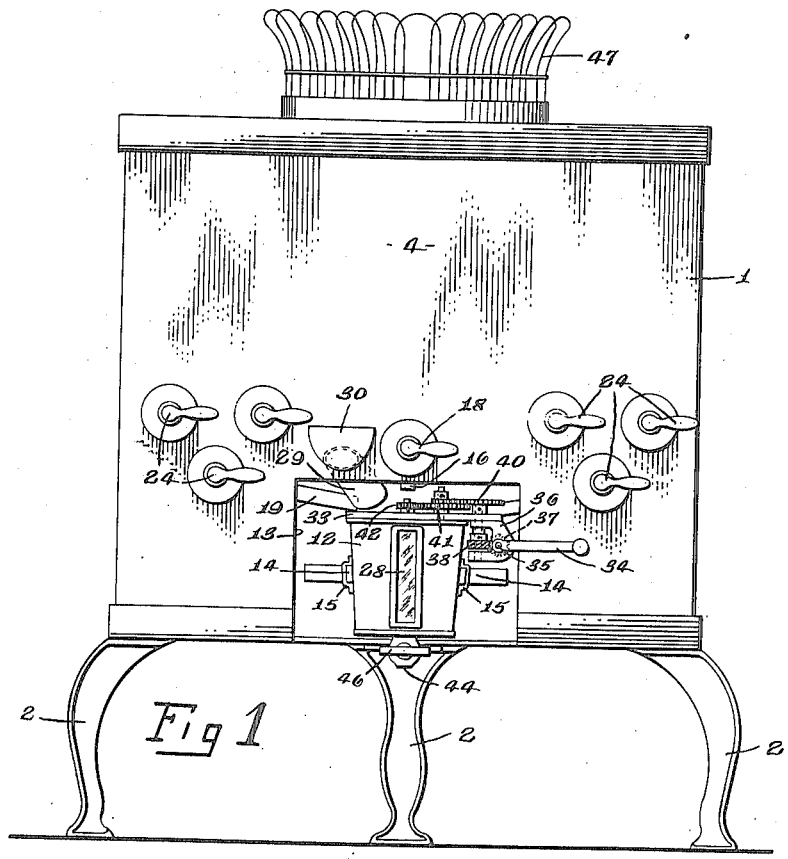
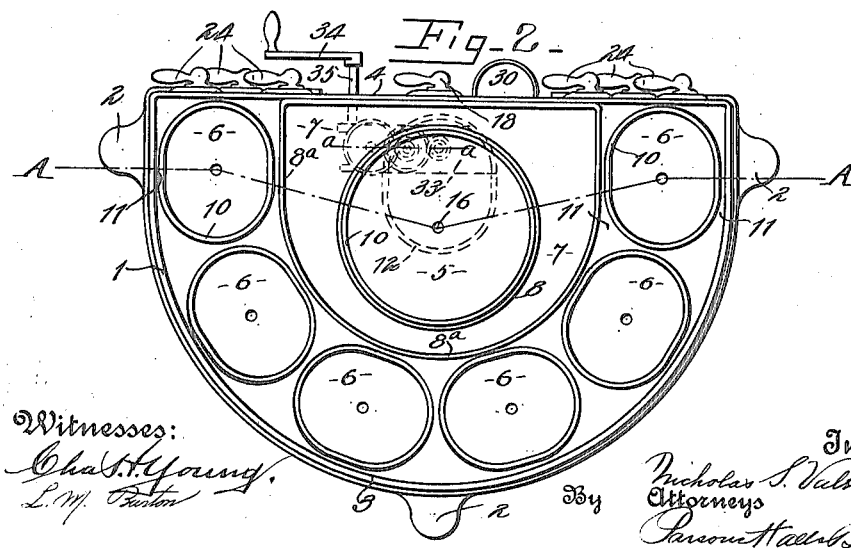

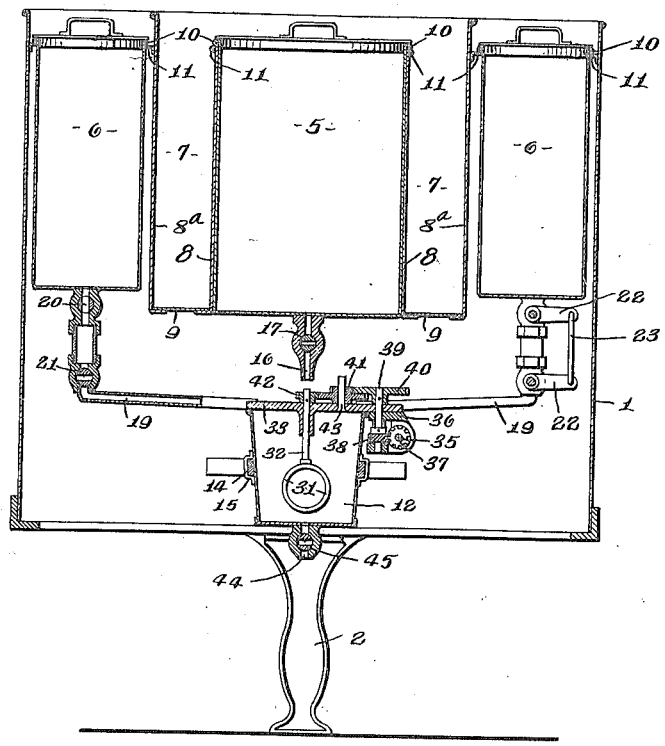

UNITED STATES PATENT OFFICE.

NICHOLAS S. VALENTINE, OF SYRACUSE, NEW YORK.

BEVERAGE MIXING AND DISPENSING MACHINE.

1,180,344.  Specification of Letters Patent.  Patented Apr. 25, 1916.

Application filed December 9, 1912. Serial No. 735,586.

*To all whom it may concern:*

Be it known that I, NICHOLAS S. VALENTINE, of Syracuse, in the county of Onondaga and State of New York, have invented a certain new and useful Beverage Mixing and Dispensing Machine, of which the following is a specification.

This invention has for its object the production of a machine for dispensing mixed drinks or beverages, which is particularly simple in construction, highly efficient in use, and rapid in operation; and it consists in the combinations and constructions hereinafter set forth and claimed.

In describing this invention reference is had to the accompanying drawings in which like characters designate corresponding parts in all the views.

Figures 1, and 2 are respectively rear elevation and plan of my beverage dispensing machine. Fig. 3 is a vertical sectional view on lines "A—A", and *a*—*a* Fig. 2, the mixing chamber only being shown on line *a*—*a* and the covers of the fluid containing receptacles being illustrated in elevation. Fig. 4 is a detail view of one form of means for operating the valves of the outlet conduits or pipes of the fluid containing receptacles.

This beverage dispensing machine comprises, generally, a casing, a plurality of receptacles in the casing, one containing the body of the beverage, and the others containing flavoring or other liquids, a mixing chamber located in the casing, and having a manually-operated valve-controlled outlet, manually-operated valve-controlled outlet conduits or pipes connected to the receptacles and arranged to discharge into the mixing chamber, and a conduit supported by the casing independently of the mixing chamber and having its outer end located outside of the casing, and its inner end located within the casing in position to discharge into the mixing chamber. The latter conduit may be used for permitting additional matter as an egg to be mixed with the beverage or for permitting the injection of a cleansing fluid as hot water into the mixing chamber.

1 is the casing which may be of any desirable form, size and construction, it being here shown as supported on legs 2 and as having a cylindrically curved front wall 3 and a substantially flat rear wall 4.

5 is a receptacle located within the casing 1 and being here shown as located substantially concentric with the axis of the cylindrically curved wall 3, the receptacle 5 being for the purpose of containing the body liquid of the beverage as milk.

6 are additional receptacles located in arc-shaped series about the receptacle 5, these receptacles 6 being for the purpose of containing flavoring fluids to be mixed with the body liquid, discharged from the tank or receptacle 5.

The receptacle 5 is surrounded by an annular chamber 7 formed by inner and outer side walls 8 and 8ª extending between the receptacles 5 and 6, and a bottom 9, the chamber 7 being for the purpose of receiving ice which refrigerates the contents of the receptacles. The inner wall 8 is substantially cylindrical and substantially fits the receptacle 5, and the outer wall 8ª is formed with a flat rear side lying against and fixed to the flat rear side of the casing and with a substantially semi-cylindrical portion corresponding to, and spaced apart from, the semi-cylindrical portion of the casing.

All of the receptacles 5 and 6 are provided with beads as 10 at their upper edges which engage suitable shoulders 11 provided on the casing and on the walls 8 and 8ª.

12 is a mixing chamber located in the casing below the tank or receptacle 5, the mixing chamber 12 being located near and visible through an opening 13 in the rear wall 4 of the casing, and being detachably supported on prongs 14 extending rearwardly from the inner face of the front wall toward the opening 13, the mixing chamber 12 having metallic straps 15 on opposite sides thereof for receiving said prongs.

16 is an outlet conduit depending from the receptacle 5 and arranged to discharge into the chamber 12.

17 is a valve for controlling the flow through said conduit 16, the valve having a suitable handle 18 located on the rear side of the casing 1, centrally thereof.

19 are conduits connected respectively to the receptacles 6 for the flavoring fluids, and arranged to discharge into the chamber 12, these conduits 19 having suitable measuring devices therein. Each of such devices, as here shown, consists of valves 20 and 21 spaced apart in one conduit, one valve being arranged to be open, while the other is closed as seen in Fig. 3. These valves 20 and 21, as well as the valve 17, are shown as rotary valves, and the valves 20 and 21 have rock arms 22 which are connected to a link 23 so that they will be actuated together and one alternately opened and closed with the other.

The valves 20 and 21 are actuated by means of handles 24 located on the rear side of the casing, each handle 24 being mounted on a rock shaft connected by a universal joint 25, Fig. 4, to one end of a shaft 26, the other end of which is connected by a universal joint 27 to one of the valves 20 or 21. Any other form of measuring device may be substituted for that shown herein.

The outlet 16 for the receptacle 5 containing the body liquid is unprovided with a measuring device but the mixing chamber 12 is formed with a gage consisting of a transparent wall 28 through which the operator can observe how much of the liquid has been discharged into the mixing chamber.

29 is a conduit extending through the rear wall 4 of the casing 1 and supported by said casing independently of the measuring chamber, said conduit having its intake end provided with a hopper or funnel 30 and its inner end arranged within the casing in position to discharge into the mixing chamber. The conduit 29 is for the purpose of permitting additional matter to be mixed in the beverage as an egg or fruit juice. This conduit may also be utilized for the purpose of running hot water into the mixing chamber to clean the same.

31 is an agitator located within the mixing chamber, and here shown as including a vertically extending shaft 32 journaled in a bearing formed in a cross bar 33 removably mounted on, or suitably fixed to the mixing chamber and extending across the top thereof and at the rear of the exit ends of the conduits 16, 19 and 29. The agitator is actuated by means of a crank handle 34 located on the outside of the casing and power-transmitting means between the crank handle and the shaft 32.

The handle and the power-transmitting means are carried wholly by the mixing chamber, the handle being mounted on a rock shaft 35 journaled in bearings in a bracket 36 located at one side of the mixing chamber and supported by the cross bar 33. The power-transmitting means consists of spiral gears 37 and 38 mounted respectively on the shaft 35 and a vertical shaft 39 supported by said bracket 36 and projecting above the top bar 33, and spur gears 40, 41 and 42 mounted respectively on the shaft 39, a stud shaft 43 projecting from the top bar 33, and on the upper end of the shaft 32. Obviously upon the removal of the mixing chamber, the entire mechanism associated therewith is also removed.

The mixing chamber 12 is provided with an outlet 44 controlled by a suitable valve 45 having a handle 46 located on the rear side of the casing, the outlet being arranged to discharge into a glass arranged beneath the casing 1. A suitable rack 47 for containing eggs or other articles may be provided on the top of the casing.

This machine is designed to be set upon the counter, and in operation, the operator operates the valve 17 to permit the body liquid as milk to flow into the mixing chamber, then operates one of the valve handles 24 to permit the flavoring fluid to flow into said chamber, and if it is desired to mix other matter in the beverage as an egg, the same can be placed in the mixing chamber through the conduit 29. The ingredients are then mixed by turning the handle 34 and the mixed ingredients then drawn into a glass by opening the valve 45.

My machine is particularly advantageous in that it is compact in its construction and in that the drinks can be mixed in much shorter time than by placing the several ingredients in a glass and shaking the same in the old fashioned manner.

What I claim is:

1. In a beverage mixing and dispensing machine comprising a substantially semi-cylindrical casing having a substantially flat rear wall, a substantially annular chamber within the casing, said chamber having a cylindrical inner wall, fluid containing receptacles arranged in a semi-annular series between opposing walls of the casing and the chamber, an additional fluid containing receptacle located within the inner wall of the substantially annular chamber, a mixing chamber within the casing beneath the fluid receptacles and having a valve controlled outlet, conduits opening from said fluid-containing receptacles respectively, and discharging into the mixing chamber, and valves connected in the conduits and having handles located on said rear wall of the casing, substantially as and for the purpose described.

2. A beverage mixing and dispensing machine comprising a casing having a vertical wall comprising a substantially semi-cylindrical portion and a substantially flat rear side, a mixing chamber located within the lower portion of the casing and having a valve-controlled discharge at the bottom thereof, a refrigerator chamber located in the casing above the mixing chamber and having a cylindrical inner wall and an outer wall, the outer wall having a flat rear side corresponding to the flat side of the casing and secured thereto, said outer wall of the refrigerator chamber having a substantially semi-cylindrical portion corresponding to, and spaced apart from, the semi-cylindrical portion of the wall of the casing, a plurality of syrup containers disposed in the space between said semi-cylindrical portions and having individual connection leading therefrom and discharging into the mixing chamber, a main liquid container arranged within the inner wall of the refrigerator chamber, and having a connection discharging into the mixing chamber, and valves for controlling the flow through said connections, the valves having hand-operated members accessible at the rear side of the casing, substantially as and for the purpose specified.

3. A beverage mixing and dispensing machine comprising a casing having a cylindrically curved front wall and a substantially flat rear wall, a receptacle for the body of the beverage located within the casing substantially concentric with the axis of said curved wall, receptacles for other liquids located within the casing, in a concentric series around the former receptacle, a refrigerator chamber between the first-mentioned receptacle and the series of receptacles, a mixing chamber within the casing located below the receptacles, conduits opening from said receptacles respectively and discharging into the mixing chamber, valves connected in the conduits and having handles located on said rear wall of the casing, an outlet conduit arranged to discharge from the mixing chamber into a glass located below the mixing chamber, a valve for controlling the flow through said outlet conduit, said valve having a handle exposed at the rear of the casing, an agitator located within the mixing chamber and having a handle located at the rear of the casing, and a conduit opening through the rear wall of the casing and having its inlet end at the outside of said wall and its outlet end within the casing and arranged to discharge into the mixing chamber, substantially as and for the purpose set forth.

4. A beverage mixing and dispensing machine comprising a substantially semi-cylindrical casing having a flat rear wall, fluid-containing receptacles within the casing terminating short of the bottom thereof, the casing being formed with an opening in its rear wall, a mixing chamber located in the casing beneath the receptacles and being exposed through said opening, said mixing chamber having a valve-controlled outlet, conduits opening from said fluid-containing receptacles and discharging into the mixing chamber, and valves connected in the conduits and having handles exposed on said rear wall of the casing, substantially as and for the purpose described.

5. A beverage mixing and dispensing machine comprising a casing having an opening in its wall, fluid containing receptacles within the casing terminating short of the bottom thereof, a mixing chamber located in the casing below the receptacles and removable from within the casing through said opening, said mixing chamber having a valve-controlled outlet, conduits opening from said fluid-containing receptacles respectively and discharging into the mixing chamber, valves connected in the conduits and having handles located on the outside of the casing, agitating means in the mixing chamber and having a handle supported by the mixing chamber independently of the casing and exposed on the outside of the casing, and a conduit supported by the casing independently of the mixing chamber and having its intake end located on the outside of the casing and its outlet end within the casing and arranged to discharge into the mixing chamber, substantially as and for the purpose specified.

In testimony whereof, I have hereunto signed my name in the presence of two attesting witnesses, at Syracuse, in the county of Onondaga, in the State of New York, this 6th day of Dec., 1912.

NICHOLAS S. VALENTINE.

Witnesses:
CHAS. H. YOUNG,
L. M. BURTON.